3,031,292
METHOD FOR THE CONTROL OF WEEDS
Charles W. Todd, Westtown, Pa., assignor to E. I. du Pont de Nemours and Company, Wilmington, Del., a corporation of Delaware
No Drawing. Filed June 22, 1959, Ser. No. 821,624
5 Claims. (Cl. 71—2.6)

This invention relates to herbicidal compositions and methods employing a class of substituted ureas as essential active ingredients.

Because of the enormous losses caused by weeds, the problem of weed control is a major one in agricultural economy. While there are many known herbicides available to combat weeds, there still exists a great need for additional herbicides that possess certain unique and specific herbicidal properties against certain classes of undesirable vegetation, including crabgrass, barnyard grass and giant foxtail, some of which remain resistant at reasonable rates to the presently available weed killers.

It is therefore an object of the present invention to provide new and useful herbicidal compositions and methods. Another object is to provide a specific group of chemical weed killers having outstanding effectiveness against weeds while exhibiting remarkable safety on economic crops by lack of injury or damage thereto. A particular object is to provide novel compositions and methods which enable effective pre-emergence control of noxious weeds in sensitive crops, such as peanuts and soybeans. The invention is particularly adapted to effective kill of weeds, including those in non-crop land, by contact application. Post-emergence application is especially successful in some applications.

The compounds employed in the compositions and methods of the invention are represented by the formula (1) 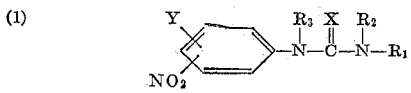

wherein X is oxygen or sulfur; Y is hydrogen or chlorine; $R_1$, $R_2$ and $R_3$ can be the same or different and are hydrogen, methyl or ethyl; with the proviso that at least one of $R_1$, $R_2$ and $R_3$ is alkyl and that the three of them together contain less than 5 carbon atoms.

Preferably X is oxygen, $R_3$ is hydrogen and the nitro substituent is in the meta position on the ring. Particularly preferred compounds include 3-(4-chloro-3-nitrophenyl)-1,1-dimethylurea, 3-(m-nitrophenyl)-1,1-dimethylurea and 3-(4-chloro-3-nitrophenyl)-1-ethyl-1-methylurea.

Thus, the better compounds appear to be those where the nitro substituent is in the meta position on the benzene ring with respect to the ureido nitrogen, and Y is chlorine substituted in the para position. Preferably $R_2$ is methyl.

Illustrative of the substituted ureas employed in the herbicidal compositions and methods of the invention are the following:

(1) 1,1-dimethyl-3-(p-nitrophenyl)urea
(2) 1,1-dimethyl-3-(m-nitrophenyl)urea
(3) 1,1-dimethyl-3-(o-nitrophenyl)urea
(4) 1,1-dimethyl-3-(m-nitrophenyl)-2-thiourea
(5) 1,1-dimethyl-3-(o-nitrophenyl)-2-thiourea
(6) 1,1-dimethyl-3-(p-nitrophenyl)-2-thiourea
(7) 1,1-diethyl-3-(m-nitrophenyl)urea
(8) 1,1-diethyl-3-(p-nitrophenyl)urea
(9) 1-methyl-3-(p-nitrophenyl)urea
(10) 1-(p-nitrophenyl)-1,3,3-trimethylurea
(11) 1,3-dimethyl-1-(m-nitrophenyl)urea
(12) 1-(m-nitrophenyl)-1,3,3-trimethylurea
(13) 3-(o-nitrophenyl)-1,1,3-trimethyl-2-thiourea
(14) 1,1-dimethyl-3-(3-nitro-4-chlorophenyl)urea
(15) 1,1-dimethyl-3-(3-nitro-4-chlorophenyl)-2-thiourea
(16) 1-ethyl-1-methyl-3-(3-nitro-4-chlorophenyl)urea
(17) 1-methyl-1-(3-nitro-4-chlorophenyl)urea
(18) 1,3-dimethyl-1-(3-nitro-4-chlorophenyl)urea
(19) 1,1-diethyl-3-(3-nitro-4-chlorophenyl)urea
(20) 3-(3-nitro-4-chlorophenyl)-3,1,1-trimethylurea
(21) 1-methyl-3-(3-nitro-4-chlorophenyl)urea
(22) 1-methyl-3-(3-nitro-4-chlorophenyl)-2-thiourea
(23) 1,1-dimethyl-3-(2-nitro-4-chlorophenyl)urea
(24) 1-methyl-3-(2-nitro-5-chlorophenyl)urea
(25) 3-(3-chloro-4-nitrophenyl)-1,1-dimethylurea
(26) 3-(3-chloro-4-nitrophenyl)-1,3-dimethylurea
(27) 3-(2-chloro-4-nitrophenyl)-1,1-dimethylurea The ureas employed in the compositions and methods of this invention can be prepared by conventional methods, for example, by the reaction of aliphatic and aromatic primary and secondary amines with an isocyanate, isothiocyanate, carbamyl chloride, or thiocarbamyl chloride in accordance with well known techniques. By way of example, the substituted ureas can be prepared in accordance with the following reaction:

(3) 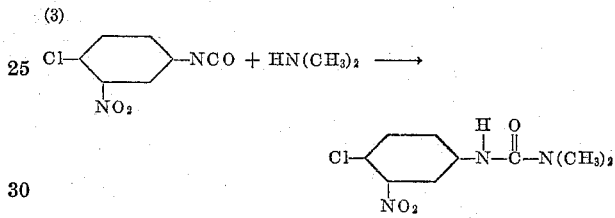

This reaction is accomplished by bringing the amine in contact with the isocyanate in approximately chemically equivalent amounts. Ordinarily an inert liquid medium, for example, dry benzene, dry toluene, dry dioxane and the like are employed in this reaction. The reaction can be carried on readily at room temperature. Alternatively, the substituted urea can be prepared by the following reaction:

(4) 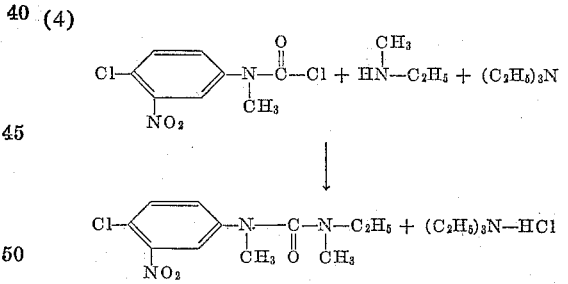

In accordance with this procedure, a slight excess of the amine added slowly at room temperature to a stirring solution of the properly substituted carbanilyl chloride in an inert medium, for example, benzene, xylene or dry dioxane, containing an equivalent of triethyl amine yields the desired urea of reasonable purity. The triethyl amine hydrochloride can be removed by water washing the solid urea product.

The herbicidal compositions of the invention are prepared by admixing one or more of the substituted ureas defined heretofore, in herbicidally effective amounts, with a conditioning agent of the kind used and referred to in the art as a pest control adjuvant or modifier in order to provide formulations adapted for ready and efficient application to soil or weeds (i.e., unwanted plants) using conventional applicator equipment.

Thus the herbicidal compositions, or formulations, are prepared in the form of either powdered solids or liquids. The liquid compositions, whether solutions or dispersions of the active substituted urea in a liquid diluent, contain as a conditioning agent a surface-active dispersing agent in amounts sufficient to render the liquid composition readily dispersible in water for application as an aqueous spray. The powdered solid herbicidal compositions preferably also contain a surface-active dispersing agent in amount sufficient to impart water dispersibility to the powdered compositions, although the surface-active dispersing agent can be omitted if it is desired to apply the compositions by dusting rather than spraying. However, even though the surface-active dispersing agent be omitted in the latter event, the herbicidal composition will still contain, of course, a powdered solid carrier or diluent as a conditioning agent.

The surface-active dispersing agents employed in the herbicidal compositions of the invention are sometimes referred to in the art as wetting, dispersing, or penetrating agents. They are agents which cause the compositions, whether in liquid or powdered solid form, to be easily dispersed in water to give aqueous sprays. They can be of the anionic, cationic, or nonionic type and include, for example, sodium and potassium oleates, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene/carbon monoxide polymers, laurylamine hydrochloride, laurylpyridinium bromide, stearyltrimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually the minimum lower concentration will be 0.1%.

Powdered or dust compositions of the invention whether or not also modified with a surface-active dispersing agent to make them water dispersible are prepared by admixing one or more of the active substituted ureas with finely divided solids, preferably, talcs, natural clays, pyrophyllite, diatomaceous earth, and flours such as walnut shell, wheat, redwood, soya bean, and cottonseed flours. Other inert solid carriers which can be used to prepare the herbicidal formulations include magnesium and calcium carbonates, calcium phosphate, sulfur, lime, etc. either in powder or granular form. The percentage by weight of the essential active ingredients will vary according to the manner in which the composition is to be applied but, in general, will be 0.5% to 95% by weight of the herbicidal composition.

The active substituted ureas can be dissolved in organic solvents such as cyclohexanol, furfural, acetone, isobutanol, ethanol, isopropylacetate, and the like in the preparation of liquid compositions of the invention. Concentrated water-dispersible liquid compositions can be prepared by incorporating the ureas and surface-active dispersing agents in various organic liquids such as furfural, methanol, isopropanol, isobutanol, xylol, cresol, cyclohexanone, acetone, methyl ethyl ketone, kerosene, trichloroethylene, dimethylformamide, dimethylacetamide, alkylated naphthalenes, and the like. Such compositions are readily dispersible in water and provide excellent aqueous herbicidal sprays for field application. The proportion of surface-active dispersing agent to urea can be 0.1 to 100% by weight in the water-dispersible herbicidal compositions.

The herbicidal compositions of the invention can also have incorporated therein oils, fats or similar vehicles such as cottonseed oil, olive oil, lard, paraffin oil, hydrogenated vegetable oils, etc. Adhesives such as gelatin, blood albumin, resins, for example, rosin alkyd resins and the like, can also be used in certain compositions to increase retention or tenacity of deposits following application.

The herbicidal compositions are applied either as a spray, granules or a dust to the locus or area to be protected from undesirable plant growth, commonly called weeds, i.e., plants growing where they are not wanted. Such application can be made directly upon the locus or area and the weeds thereon during the period of weed infestation in order to destroy the weeds, or alternatively, the application can be made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil. For some purposes, as in the treatment of ponds and lake bottoms, it will be convenient to use a pellet form of the composition.

In another method of application for weed control, the ureas are incorporated with fertilizers to form either powdery or granular herbicidal compositions that can be used in the cultivation of agricultural crops.

The active ingredients are, of course, applied in amount sufficient to exert the desired herbicidal action. The amount of herbicidally active compounds present in the compositions as actually applied for destroying or preventing weeds will vary with the herbicidal activity of the active ingredients, the purpose for which the application is being made (i.e., whether for short term or long term control), the manner of application, the particular weeds for which control is sought, and like variables. Certain of the specific examples to follow will illustrate various kinds and amounts of application and the results obtained thereby. In general, the herbicidal compositions as applied in the form of a spray, granules or a dust will contain from about 0.02% to 95% by weight of herbicidally active ingredient.

The solid and liquid compositions described and employed herein for application of the essential active herbicidal ingredient all have the common property of permitting application of the herbicidal compositions through suitable jets, nozzles, or spreaders adapted to the handling of granular materials onto the plants being treated and will, for convenience, be designated as "fluent carriers." The fluent carriers with which this invention is primarily concerned are non-solvent fluent carriers.

In order that the invention may be better understood, the following examples are given in addition to the examples already given above. The examples illustrate typical herbicidal compositions of the invention, methods of preparation, herbicidal applications, and the results obtained. The number following the tabulated ingredients represent parts by weight of the ingredients in the respective compositions.

EXAMPLE 1

*Water-Dispersible Powders*

The following powder compositions are adapted for dispersing in water for application as sprays for the destruction and prevention of weeds. The compositions are prepared by intimately mixing the listed ingredients using conventional mixing or blending equipment and then grinding the mixture to give a powder having an average particle size less than about 50 microns.

Formula A: Percent
1,1 - dimethyl - 3 - (3 -nitro - 4 - chlorophenyl)urea _____ 80.00
Alkyl naphthalene sulfonic acid Na salt ____ 1.75
Methyl cellulose (low visc.) _____ 0.25
Attapulgite clay _____ 18.00

Formula B:                                                  Percent
   1-ethyl-1-methyl-(3-nitro-4-chloro-
      phenyl)urea _____ 20.00
   Polyoxyethylene ester of mixed fatty and rosin
      acids-compound with urea _____ 3.00
   Kaolin clay _____ 77.00
Formula C:
   3-(3-nitro-4-chlorophenyl)-3,1,1-tri-
      methylurea _____ 50.00
   Oleic acid ester of sodium isethionate _____ 1.00
   Sodium lignin sulfonate _____ 0.50
   Diatomaceous silica _____ 48.50
Formula D:
   3-(3-chloro-4-nitrophenyl)-1,1-di-
      methylurea _____ 75.00
   Sodium N-methyl, N-oleoyl taurate _____ 1.75
   Naphthalene sodium sulfonate-formaldehyde
      condensation product _____ 0.50
   Synthetic calcium silicate _____ 22.75

These compositions are then extended with water to give sprayable formulations. When sprayed upon plots infested with a variety of broadleaf and grassy weeds at the rate of 25 pounds per acre of the active ingredient, an extensive kill of the weeds results.

EXAMPLE 2

Dust Formulations

The following compositions are adapted for direct application as dusts for the destruction or prevention of weeds using conventional dusting equipment. The dusts are made by blending or mixing the active ingredient with the minor absorptive diluent and grinding the mix to give a composition having an average particle size less than about 50 microns. These are then combined with the major diluent and blended.

Formula A:                                                  Percent
   3-(3-nitro-4-chlorophenyl)-1-methylurea ____ 20.00
   Attapulgite clay _____ 5.00
   Pyrophyllite _____ 75.00
Formula B:
   1,1-diethyl-3-(p-nitrophenyl)urea _____ 10.00
   Synthetic calcium silicate _____ 2.00
   Micaceous talc _____ 88.00
Formula C:
   1,1-dimethyl-3-(3-nitro-4-chlorophenyl)-2-
      thiourea _____ 40.00
   Diatomaceous silica _____ 20.00
   Tobacco dust _____ 40.00
Formula D:
   1,1-dimethyl-3-(3-nitro-4-chlorophenyl)urea _ 5.00
   Kaolin clay _____ 5.00
   Walnut shell flour _____ 90.00

These compositions have utility as a hand application for the control of annual weeds growing around power poles and highway signs at rates of 10 to 15 pounds (active) per acre.

EXAMPLE 3

Oil-Water Dispersible Powder

The following powdered compositions are adapted for use in the preparation of spray compositions using either an oil, water, or a combination of oil and water as the liquid diluent. The powders are made by mixing and grinding as in the case of the powder of Example 1.

Formula A:                                                  Percent
   3-(o-nitrophenyl)-1,1-dimethylurea _____ 70.00
   Alkylated aryl polyether alcohol (wetting and
      dispersing agent) _____ 4.00
   Fuller's earth _____ 26.00

Formula B:                                                  Percent
   3-(o-nitrophenyl)-3-methylurea _____ 70.00
   Sulfonated oil combined with polyoxyethylene
      sorbitol esters of mixed fatty and rosin
      acids _____ 5.00
   Diatomaceous earth _____ 25.00
Formula C:
   3-(3-nitro-4-chlorophenyl)-3,1,1-trimethyl-
      urea _____ 50.00
   Polyethylene glycol 400 ester of oleic acid __ 5.00
   Kaolin clay _____ 45.00

EXAMPLE 4

Water-Dispersible Liquid Composition

The following compositions are in a liquid form and are adapted for addition to water to give emulsion-dispersions for application as sprays. The urea herbicides are generally quite insoluble in most oils. Therefore, the liquid compositions ordinarily are not complete solutions but rather are dispersions of solid in an oil. The liquid or fluid compositions shown are prepared by thoroughly mixing and dispersing the active compound and conditioning agent in an organic liquid diluent.

Formula A:                                                  Percent
   3-(m-nitrophenyl)-1,1-dimethylurea _____ 25.00
   Polyethylene glycol 400 dioleate (dispersant
      for solid in oil and emulsifier for oil in
      water _____ 5.00
   Kerosene _____ 70.00
Formula B:
   3-(2-nitro-5-chlorophenyl)-1,1-dimethylurea _ 40.00
   Polyoxyethylene sorbitan mono-oleate _____ 5.00
   Diesel oil _____ 55.00

These compositions, when sprayed along a railroad bed from a spray-equipped railroad car at a dosage of 30 pounds per acre of active ingredient in 120 gallons of water give excellent weed kill.

EXAMPLE 5

Granular Composition

The following composition is adapted for application by means of a fertilizer spreader apparatus or similar equipment. The composition is readily prepared by mixing the ingredients with water to form a paste. The paste is then extruded, dried, and ground to give the desired granular size. Preferably, the granules will be in the order of one thirty-second to one-quarter inch diameter.

Percent
3-(4-chloro-3-nitrophenyl)-1,1-dimethylurea _____ 4.00
Goulac (dispersing agent) _____ 3.00
Hydrocarbon oil _____ 1.00
Dextrin (binding agent) _____ 22.00
Fuller's earth _____ 70.00

The granular formulation (2.0 lb./A. active) is applied as a pre-emergence treatment with a specially adapted tractor-mounted spreader. This application gives good control of broadleaf weeds (mustard and pigweed) and grass weeds (crabgrass and giant foxtail) and soybeans.

This application is a continuation-in-part of my copending application Serial No. 589,589, filed June 6, 1956, now abandoned, which in turn is a continuation-in-part of my application Serial No. 412,045, filed February 23, 1954 (now abandoned), which in turn is a continuation-in-part of my application Serial No. 186,118, filed September 21, 1950 (now abandoned).

I claim:
1. The method for the control of weeds which comprises applying to a locus to be protected, in amounts sufficient to exert a herbicidal action, a nitrophenylurea represented by the formula

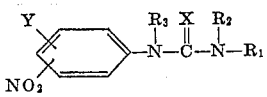

wherein X is selected from the group consisting of oxygen and sulfur; Y is selected from the group consisting of hydrogen and chlorine; and $R_1$, $R_2$ and $R_3$ can be the same or different and are selected from the group consisting of hydrogen, methyl and ethyl; with at least one of the group of $R_1$, $R_2$ and $R_3$ being alkyl and the three of them containing less than 5 carbon atoms total.

2. The method as set forth in claim 1 wherein said nitrophenylurea is 3-(4-chloro-3-nitrophenyl)-1,1-dimethylurea.

3. The method as set forth in claim 1 wherein said nitrophenylurea is 3-(m-nitrophenyl)-1,1-dimethylurea.

4. The method as set forth in claim 1 wherein said nitrophenylurea is 3 - (4-chloro-3-nitrophenyl)-1-ethyl-1-methylurea.

5. The method for killing weeds resistant to conventional weed killers comprising applying to said weeds, in an amount sufficient to kill said weeds, a nitrophenylurea represented by the formula

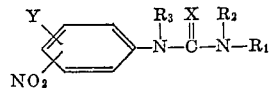

wherein X is selected from the group consisting of oxygen and sulfur; Y is selected from the group consisting of hydrogen and chlorine; and $R_1$, $R_2$ and $R_3$ can be the same or different and are selected from the group consisting of hydrogen, methyl and ethyl; with at least one of the group of $R_1$, $R_2$ and $R_3$ being alkyl and the three of them containing less than 5 carbon atoms total.

References Cited in the file of this patent
UNITED STATES PATENTS

| | | |
|---|---|---|
| 2,396,513 | Jones | Mar. 12, 1946 |
| 2,412,510 | Jones | Dec. 10, 1946 |
| 2,655,444 | Todd | Oct. 13, 1953 |
| 2,655,445 | Todd | Oct. 13, 1953 |

OTHER REFERENCES

Beilstein: "Handbuch der Organischen Chemie," 4th edition, 1929, vol. 12, page 694.